United States Patent
Dawson et al.

[15] 3,661,611
[45] May 9, 1972

[54] AZO COMPOUNDS

[72] Inventors: Fred Dawson; John Mitchell; Leslie Richard Rogers; William Todd; Arthur Topham, all of Manchester, England

[73] Assignee: Imperial Chemical Industries Limited, London, England

[22] Filed: May 1, 1970

[21] Appl. No.: 33,918

Related U.S. Application Data

[62] Division of Ser. No. 551,923, May 23, 1966, Pat. No. 3,532,520.

[52] U.S. Cl. ........................................106/308 Q, 106/288 Q
[51] Int. Cl. ...........................................................C08h 17/14
[58] Field of Search....................................106/308 Q, 288 Q

*Primary Examiner*—Tobias E. Levow
*Assistant Examiner*—J. V. Howard
*Attorney*—Cushman, Darby & Cushman

[57] ABSTRACT

A composition readily dispersible in an organic solvent and containing an azoacylacetarylamide and an azo compound of the formula

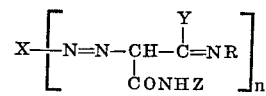

wherein X is selected from the group consisting of phenyl, diphenyl and quinoline radicals and is directly linked to the azo group through a nuclear carbon atom or said radicals, said radicals optionally carrying a substituent selected from the group consisting of chlorine, nitro, methyl and hydroxy, Y is methyl, Z is phenyl optionally substituted with a member selected from the group consisting of methoxy and methyl, R is a radical selected from the group consisting of alkyl, alkene, aminoalkyl and cyclohexyl and *n* is an integer of 1–2.

6 Claims, No Drawings

AZO COMPOUNDS

This application is a divisional of our copending application Ser. No. 551,923, filed May 23, 1966 now U.S. Pat. No. 3,532,520.

This invention relates to new azo compounds.

It has been found that new compositions of matter, of value for example in coloration processes, are obtained by heating azoacylacetarylamides with primary aliphatic amines. It is believed that these new compositions are formed by elimination of water between the carbonyl group of the acyl group and the primary amino group and contain, when expressed in the ketimine form, the group

but it is to be understood that the correctness or otherwise of this theory does not limit the scope of the invention.

According to the invention there are provided as new compositions of matter azo compounds of the formula

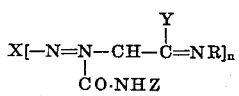

wherein X is an aryl or heterocyclic residue, Y is an alkyl, aryl or substituted aryl radical, Z is an aryl or substituted aryl radical and R is an alkyl, substituted alkyl, cycloalkyl or substituted cycloalkyl radical and n is an integer.

As examples of aryl residues which may be represented by X there may be mentioned phenyl, 3,3'-dichloro-4,4'-biphenylene, 4-methyl-2-nitrophenyl and 4-chloro-2-nitrophenyl residues.

As examples of heterocyclic residues which may be represented by X there may be mentioned the 7-chloro-2-hydroxy-4-methylquinolin-6-yl residue.

As examples of aryl or substituted aryl radicals which may be represented by Z there may be mentioned phenyl, o-anisyl and 2,4-dimethylphenyl radicals.

As examples of radicals which may be represented by Y there may be mentioned alkyl radicals such as methyl, aryl radicals such as phenyl, and substituted aryl radicals such as phenyl radicals substituted by a C(NR)·CH(CO·NHZ)·N=N—X group.

As examples of radicals which may be represented by R there may be mentioned alkyl groups such as octadecyl, substituted alkyl groups for example aminoalkyl groups such as 3-octadecylaminopropyl, 3-dimethylaminopropyl and 2-dimethylaminoethyl, and cycloalkyl groups such as cyclohexyl.

n is preferably 1 or 2.

As examples of azo compounds of the invention there may be mentioned 2-benzeneazo-3-cyclohexyliminobutyranilide, 2,2'-(3,3'-dichloro-4,4'-biphenylenedisazo)-3,3'-di-(3-octadecylaminopropylimino)-bis-butyranilide and 2,2'-(3,3'-dichloro-4,4'-biphenylenedisazo)-3,3'-di-(3-dimethylaminopropylimino)-bis-butyr-2-methoxyanilide.

The azo compounds of the invention may be prepared by heating a mixture of an azoacylacetarylamide of formula:

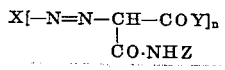

wherein X, Y, Z and n have the significances given above and an amine RNH₂ wherein R has the significance given above.

The heating may be carried out with the reactants alone or in solution in a solvent such as toluene or xylene or in suspension in an aqueous medium. Suitable temperatures are from 70° to 200° C.

It is frequently convenient to combine this process with the preparation of the azoacylacetarylamide by adding the amine to the aqueous slurry obtained after coupling the diazonium compound and the acylacetarylamide and heating the mixture, followed by filtration to isolate the azo compound of the invention.

Depending upon the relative proportion and type of amines used, the particular azoacylacetarylamide, and the reaction conditions, compositions are obtained in which the whole or only part of the available acyl groups have reacted with the amine.

Azoacylacetarylamides suitable for use in their preparation includes 2-benzeneazoacetoacetanilide, 2,2'-(3,3'-dichloro-4,4'-bi-phenylenedisazo)-bis-acetoacetanilide and 2-(4-chloro-2-nitrobenzeneazo)-acetoacetanilide.

Amines suitable for use in their preparation include the following: cyclohexylamine, oleylamine, 3-dimethylaminopropylamine and 3-octadecylaminopropylamine.

The azo compounds of the invention may also be made by condensing the amine with the appropriate acylacetarylamide by conventional methods and coupling the product obtained with the appropriate diazonium compound. The condensation product may for example be prepared by heating the two ingredients in boiling ethanol and adding the cooled ethanol solution to a stirred aqueous solution of the diazonium acetate.

The azoacylacetarylamides are in general yellow coloured compounds, and the derived azo compounds of the invention are also coloured, the introduction of the imino groups causing a bathochromia shade change.

The azo compounds of the invention are readily soluble in organic solvents and in the media used for example for gravura inks and are of value as spirit soluble dyes for use for example in colouring petrol, stains and lacquers for wood.

The azo compounds are very effective dispersing agents in organic solvents for azoacylacetarylamides. Since many of the azoacylacetarylamides are valuable pigments the incorporation of a proportion of a derived or similar azo compound of the invention provides a pigment which can be readily dispersed in an organic solvent such as toluene, white spirit, solvent naphtha or β-ethoxyethanol, used for example as a medium for ink or paint, without the necessity of mechanical grinding procedures to give dispersions satisfactory for use, for example, for printing. Such compositions of azoacylacetarylamides containing azo compounds of the invention may be obtained in a number of ways, for example by reaction of the azoacylacetarylamide with a deficiency of amine, for example from 1 to 50 percent, and preferably from 2.25 to 25 percent of the weight of azoacylacetarylamide, or by forming the azoacylacetarylamide in presence of some of the derived azo compound. The azo compounds of the invention may also be used as dispersing aids when milling the azoacylacetarylamides into for example gravure ink media when they provide stability against overgrinding.

Azo compounds of the invention having especially high dispersing power are obtained by the use of amines which are either aliphatic monoamines containing more than 12 carbon atoms or aliphatic diamines in which one of the amino groups is a primary amino group and the other either a secondary or tertiary amino group.

Pigments containing azo compounds of the invention derived from 2-dimethylaminoethylamine or 3-dimethylaminopropylamine show particularly good stability to overgrinding and improved flow properties when ground for example into gravure ink media.

The azo compounds of the invention resulting from the use of amines containing additional basic amino groups in the molecule are soluble in aqueous acids. Particularly suitable amines for use in the preparation of these azo compounds include 3-dimethylaminopropylamine and 2-dimethylaminoethylamine.

The invention is illustrated but not limited by the following examples in which all parts and percentages are by weight unless otherwise stated.

EXAMPLE 1

A solution of 53 parts of Duomeen T (commercial 3-octadecylaminopropylamine) (Duomeen is a Registered Trade Mark) in 16 parts of acetic acid and 285 parts of water is added to the aqueous slurry of Colour Index Pigment Yellow 12 obtained by the tetrazotisation of 126.5 parts of 3,3'-dichlorobenzidine and coupling with 177 parts of acetoacetanilide. Aqueous sodium hydroxide is added to raise the pH to 12 after which the suspension is heated to 90° C. resulting in complete flocculation of the pigment composition. The suspension is then filtered and the solid obtained washed with water and dried in an air oven at 70° C. The dried product, which is ground to powder, is characterized by the fact that it instantly disperses in organic solvents or the medium for gravure inks to give a fine dispersion suitable for printing without any grinding or further treatment. The untreated pigment requires to be ground into the medium before the ink therefrom can be considered suitable for use.

EXAMPLE 2

27 parts of Duomeen T are weighed into a Beken-Duplex mixer and heated until molten at a temperature of 60° C. 73 parts of dry Colour Index Pigment Yellow 12 are slowly added and the temperature raised to 140° C. A plastic mass is produced and there is a marked colour change from greenish yellow to reddish brown. The mass is allowed to cool when it becomes solid and after discharging from the mixer the lumps are ground to powder. The pigment composition obtained from this treatment is characterised by the same instant dispersion properties as those described for the pigment composition of example 1. X-ray examination of the pigment composition shows a distinctly different pattern from that of the untreated pigment.

EXAMPLE 3

The procedure of example 2 is repeated replacing the Duomeen T by Duomeen C (commercial dodecylaminopropylamine). A pigment composition similar to that described in example 2 is obtained.

EXAMPLE 4

The procedure of example 2 is repeated replacing Duomeen T by Armeen O (commercial oleylamine) (Armeen is a Registered Trade Mark) to give a similar product.

EXAMPLE 5

The procedure of example 2 is repeated replacing Duomeen T by Armeen C (a primary amine based on coco fatty acids) to give a similar product.

EXAMPLE 6

A mixture of 20 parts of C.I. Pigment Yellow 12 and 60 parts of Duomeen T is stirred for 16 hours at a temperature between 90° and 100° C., and then 30 minutes at 150° C. The product is dissolved in 216 parts of hot toluene and precipitated by the addition of 792 parts of hot methanol. The solid is filtered off, washed with 396 parts of hot methanol and dried to give 28.3 parts of an amorphous brown tacky solid, readily soluble in toluene.

EXAMPLE 7

79 parts of Duomeen T are dissolved in 79 parts of hot ethanol. After cooling to 35° C., 36.6 parts of acetoacetanilide are added. The solution is brought to the boil, allowed to cool to 35° during 45 minutes, and a further 158 parts of ethanol are added.

500 parts of an aqueous solution of tetrazotised 3:3'-dichlorobenzidine (made from 25.3 parts of dichlorobenzidine) are stirred in an ice bath while 36 parts of sodium acetate crystals are added until the solution is no longer acid to Congo Red. The alcoholic solution from above is added to the aqueous solution during 2 minutes. After stirring for 15 minutes, 464 parts of 2-ethoxyethanol is added. After stirring for 30 minutes, ammonia is added until the solution is alkaline to Brilliant Yellow. The amorphous brown product is extracted with 745 parts of chloroform and after separation from the aqueous phase, the chloroform solution is filtered from a trace of insoluble matter and evaporated to 300 parts. 237 parts of hot methanol is added and the product is filtered off, washed with 395 parts of hot methanol and dried. The product is similar to that obtained as described in example 6.

EXAMPLE 8

A mixture of 5 parts of C.I. Pigment Yellow 12 and 20 parts of 3-dimethylaminopropylamine is stirred for 16 hours at a temperature between 90° and 100° C. After diluting with 120 parts of water, the solid product obtained is filtered off, washed with water and dried. Yield 6.7 parts. It is readily soluble in cold dilute acetic acid. The melting point of the condensate is about 237°–239° C., but depends on the rate of heating. As isolated, it forms a dihydrate which crystallises unchanged from chlorobenzene, but which is dehydrated by heating for several hours under reduced pressure at 100° C.

The dihydrate on analysis contains carbon 60.8 percent, hydrogen 6.2 percent, and nitrogen 17.0 percent, the theoretical figures for $C_{42}H_{50}Cl_2N_{10}O_2, 2H_2O$ being carbon 60.5 percent, hydrogen 6.5 percent, and nitrogen 16.8 percent. The dehydrated product contains carbon 62.6 percent, hydrogen 6.3 percent, and nitrogen 17.4 percent, the theoretical figures of $C_{42}H_{50}Cl_2N_{10}O_2$ being carbon 63.2 percent, hydrogen 6.3 percent and nitrogen 17.6 percent.

EXAMPLE 9

88.5 parts of acetoacetanilide are gradually added with stirring to 56.7 parts of 3-dimethylaminopropylamine. There is an immediate exothermic reaction and the temperature rises spontaneously to 68° C. The reaction is completed by stirring for 30 minutes at 90° C. On cooling, a viscous gum is formed, which crystallises slowly on standing (more rapidly on seeding). The solid is a hydrate; on drying over sulphuric acid in a vacuum desiocator it forms a gum, which can be crystallised as the hydrate again by stirring with water and seeding. The solid, after filtration and washing with water, can be dried in a vacuum desiccator over sodium chloride.

The β-3-dimethylaminopropylaminocrotonanilide so obtained melts at 58°–60° C. in a sealed tube and analyses for $C_{15}H_{23}NO \cdot \frac{1}{2}H_2O$ (found carbon 66.6 percent, hydrogen 8.9 percent, requires carbon 66.7 percent, hydrogen 8.9 percent). It is very sensitive to acids; even in cold dilute acetic acid it is rapidly hydrolysed with regeneration of a cetoacetanilide, and for this reason it is beat coupled with diazonium salts by gradual addition of an alcoholic solution of the β-3-dimethylaminopropylaminocrotonanilide to a buffered solution of the diazonium salt, when it couples immediately.

400 parts of an aqueous solution of tetrazotised 3,3'-dichlorobenzidine (made from 25.3 parts of dichlorobenzidine are stirred in ice while 36 parts of sodium acetate crystals are added until the solution is no longer acid to Congo Red test paper. A solution of 70 parts of β-3-dimethylaminopropylaminocrotonanilide in 158 parts of ethanol is added during 2 minutes, adding ice as required to keep the temperature below 20° C. After stirring for 5 minutes, ammonia is added until the suspension is alkaline to Brilliant Yellow. The product is filtered off, washed with water, dried, and recrystallised from chlorobenzene. It is identical with the product of example 8.

EXAMPLE 10

100 parts of C.I. Pigment Yellow 12 and 10 parts of 3-dimethylaminopropylamine are mixed for 16 hours by tumbling in a cylindrical container on horizontal rollers. The mixture is kept at a temperature between 80° and 85° for 6 hours at atmospheric pressure, and than at 80° for 4½ hours at 20 mm. of mercury pressure. After cooling, the product is ground and passed through a 30's mesh sieve. In comparison with untreated C.I. Pigment Yellow 12, the treated pigment when used in a gravure ink gives a much less viscous mill base, superior print finish and greater tinctorial strength. In the above example, the Pigment Yellow 12 may be replaced by Colour Index Pigment Yellow 3, when a similar improvement is obtained.

EXAMPLE 11

10 parts of the product from example 6 are dissolved in 100 parts of β-ethoxyethanol at a temperature of 90° C. and the solution added to 3,000 parts of an aqueous slurry containing 90 parts of C.I. Pigment Yellow 12. After filtration, washing and drying the treated pigment which is ground to a powder readily disperses in organic solvents or the medium for gravure inks to give a fine dispersion suitable for printing without further grinding or other treatment.

EXAMPLE 12

1.25 parts of the product prepared as described in example 8 and 48.75 parts of C.I. Pigment Yellow 12 are mixed into 950 parts of an aromatic hydrocarbon based gravure ink medium (containing 400 parts of zinc rosinate and 550 parts of solvent) and the mixture stirred with a high speed stirrer for 20 minutes. The resulting gravure ink has much better flow properties than a similar ink, in which the product from example 8 is omitted. On prelonged milling the strength of the ink containing the product from example 8 is not significantly reduced whereas the ink containing none of the product from example 8 gives serious loss in strength.

EXAMPLE 13

25.3 parts of 3,3'-dichlorobenzidine are tetrazotised in known manner with hydrochloric acid and sodium nitrite, filtered, and the filtrate diluted to 800 parts with water.

36.0 parts of acetoacetanilide and 8.2 parts of caustic soda are dissolved in water, and the solution filtered, and diluted to 800 parts with water. To this solution is added 7.0 parts of the product of example 8 dissolved in 6 parts of acetic acid and 150 parts of water at 20° C. The acetoacetanilide is precipitated by the addition of 10 parts of acetic acid dissolved in 50 parts of water, added over 10 minutes. 70 parts of sodium acetate crystals are then added.

The solution of tetrazo compound is added to the anilide suspension over 90 minutes until only a very slight excess of acetoacetanilide remains uncoupled, the temperature being held between 10° and 20° C. When coupling is complete caustic soda solution is added until the yellow suspension is alkaline to Brilliant Yellow. The alkaline suspension is heated to 90° C. and held at this temperature for ½ hour, filtered, and the solid washed with water until electrolyte has been removed.

The pigment composition obtained is dried in an oven at 65° C. to give a yellow powder which disperses readily in gravure ink medium giving increased strength, brightness and flow compared with the pigment made in the normal way.

What is claimed is:

1. A composition readily dispersible in an organic solvent and containing an azoacylacetarylamide and an azo compound of the formula

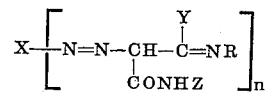

wherein X is selected from the group consisting of phenyl, diphenyl and quinoline radicals and is directly linked to the azo group through a nuclear carbon atom of said radicals, said radicals optionally carrying a substituent selected from the group consisting of chlorine, nitro, methyl and hydroxy, Y is methyl, Z is phenyl optionally substituted with a member selected from the group consisting of methoxy and methyl, R is a radical selected from the group consisting of alkyl, alkene, aminoalkyl and cyclohexyl and $n$ is an integer of 1–2.

2. The composition of claim 1 wherein R is aminoalkyl.

3. The composition of claim 2 wherein said aminoalkyl is aminoethyl or aminopropyl.

4. The composition of claim 2 wherein said aminoalkyl is a secondary or tertiary aminoalkyl.

5. The composition of claim 4 wherein said aminoalkyl is alkylaminoalkyl or dialkylaminoalkyl.

6. The composition of claim 1 wherein the azo compound is selected from the group consisting of 2-benzeneazo-3-cyclohexyliminobutyranilide, 2,2'-(3,3'-dichloro-4,4'-biphenylenedisazo)-3,3'-di-(3-octadecylaminopropylamino)-bis-butyranilide and 2,2'-(3,3'-dichloro-4,4'-biphenylenedisazo)-3,3'-di-(3-dimethylaminopropylimino)-bis-butyr-2-methoxyanilide.

* * * * *

UNITED STATES PATENT OFFICE
CERTIFICATE OF CORRECTION

Patent No. 3,661,611　　　　　　Dated May 9, 1972

Inventor(s) Fred Dawson et al.

It is certified that error appears in the above-identified patent and that said Letters Patent are hereby corrected as shown below:

On the cover sheet insert-- [30] Foreign Application Priority Data　　Great Britain　　23352/65　　June 1, 1965 --.

Signed and sealed this 24th day of June 1975.

(SEAL)
Attest:

RUTH C. MASON
Attesting Officer

C. MARSHALL DANN
Commissioner of Patents
and Trademarks